United States Patent [19]

Foster

[11] Patent Number: 4,736,120
[45] Date of Patent: Apr. 5, 1988

[54] TIMING EXTRACTION CIRCUIT

[75] Inventor: Basil B. Foster, London, United Kingdom

[73] Assignee: STC Plc, London, England

[21] Appl. No.: 679,987

[22] Filed: Dec. 10, 1984

[30] Foreign Application Priority Data

Dec. 12, 1983 [GB] United Kingdom ............. 8333612

[51] Int. Cl.⁴ .................. H03B 1/00; H03K 1/17
[52] U.S. Cl. ................... 307/269; 307/527; 307/518; 328/139; 328/63; 328/72
[58] Field of Search ............ 307/527, 269, 518, 262; 328/63, 72, 133, 139, 109; 330/291, 88, 98, 99

[56] References Cited

U.S. PATENT DOCUMENTS

| 3,304,505 | 2/1967 | Pricer ............................ 328/139 |
| 3,863,173 | 1/1975 | Scheib et al. ................... 330/98 |
| 4,508,166 | 4/1986 | Okano ............................ 358/153 |

FOREIGN PATENT DOCUMENTS 1177760 6/1968 United Kingdom .
1127802 9/1968 United Kingdom .
1246634 9/1968 United Kingdom .
1252074 11/1971 United Kingdom .
1386641 3/1975 United Kingdom .
1508780 4/1978 United Kingdom .

Primary Examiner—Stanley D. Miller
Assistant Examiner—Richard Roseen
Attorney, Agent, or Firm—Kerkam, Stowell, Kondracki & Clarke

[57] ABSTRACT

A regenerator for an undersea optical transmission system has a timing extraction circuit for extracting the clock signal from an NRZ PCM signal. The circuit comprises a surface acoustic wave filter (F) which feeds an amplifier which comprises a number of similar cascaded amplifier sections provided by an integrated circuit. The first stage is a grounded base stage (stage 1) and the following sections each include a balanced emitter-follower buffer stage (stage 2) and a balanced long-tailed pair stage (stage 3). Any base and emitter voltages in an amplifier section are minimised if not eliminated by the long-tailed pair having equal emitter and collector loads.

24 Claims, 4 Drawing Sheets

Fig. 2.
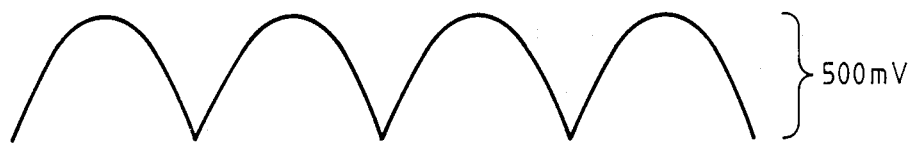
500 mV
Fig. 3.
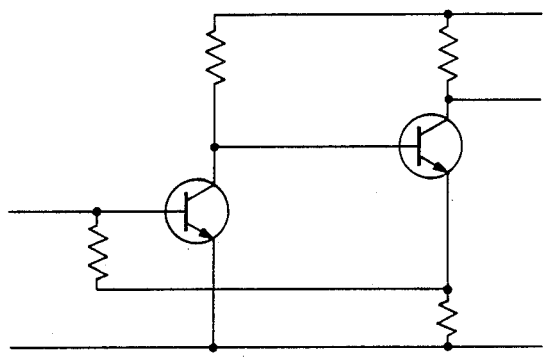
Fig. 5.
F1.   $E = V \cdot \dfrac{A}{A+B} + v \left[ \dfrac{\beta (1 + \frac{c}{d}) - A \frac{b}{d}}{A+B} \right] - \dfrac{i_0 \, \ell A}{A+B}$
Fig. 6.
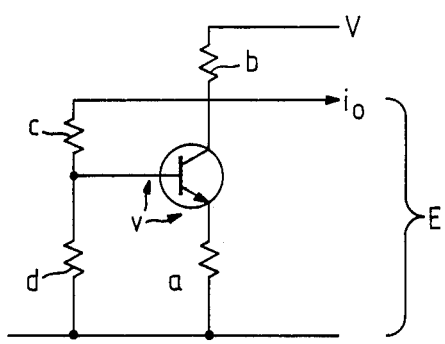

0.8 VOLTS 1.4 VOLTS

TIMING EXTRACTION CIRCUIT

This invention relates to a timing extraction circuit for a digital signal repeater, particularly but not exclusively for an optical undersea telecommunications system.

Our co-pending British patent application No. 8221908 describes an optical repeater clock extraction circuit which has a passive tank or resonator circuit driven from a clock signal extracted from the incoming data stream. FIG. 1 shows in block form the regenerator circuit.

Referring to FIG. 1 this shows one regenerator module for a repeater for one transmission direction (left to right). There would be another such module for the opposite transmission direction (not shown).

The regenerator modules are powered from a constant line current source at the terminal.

Received light is detected by a PIN divide FET combination 10 biassed to give an electrical output varying linearly with the received light level. The signal is pre-amplified 11, amplified 12 and equlized 13. Retiming information is derived by circuit 15 from the data stream and is based on the use of a clock extraction from the data stream, in this embodiment 320 MHz. AGC circuit 14 ensures a fixed level data signal at the output of amplifier 12. A decision and retiming circuit 16 compares the data pulse with a reference voltage at the rising edge of each clock pulse and interprets the data pulse as 0 or 1, and retimes the regenerated data.

A gallium aluminium arsenide laser 17 operating at 1.3 μm is used as a transmitter and its output is modulated with non-return-to-zero (NRZ) data by laser modulator 18.

Similarly the received data is NRZ.

The timing extraction circuit 15 extracts timing or clock information from the received data stream which is used to drive a passive tank circuit. With the kind of bit patterns used in this system the clock content is going to vary by 16 to 18 dB yet a clock accuracy of 1 in $10^{11}$ is required. Because the clock content will vary over this wide range a passive clock generator driven by the extracted clock signal may tend to die in amplitude. Thus with a NRZ signal the clock content of the received data varies with the pattern, e.g. 10101010,10101010 is a signal with maximum clock content. 11111111,00000000 is a signal with very much less clock content. The timing (clock) extraction circuit 15 described in the aforementioned patent application extracts the clock content from such various signals and delivers almost constant power to a filter which actually selects the clock frequency signal.

It is an object of the present invention to provide an improved clock extraction circuit.

According to the present invention there is provided a clock extraction circuit for extracting the clock signal from an NRZ PCM signal, the circuit comprising: a filter for selecting the clock frequency from the received data signal; and an amplifier for amplifying the selected signal and including a plurality of similar cascaded amplifier sections provided by an integrated circuit, any offset voltages in an amplifier section being minimized by the use of selective local feedback.

According to another aspect of the present invention there is provided a digital regenerator for regenerating the signal in an optical digital transmission system comprising: a light input detector; a main amplifier for amplifying the electrical signal derived from the detector; a decision and retiming circuit connected to receive the amplified signal; a light output device for providing an output light signal representative of the signal from the decision and retiming circuit; and a clock extraction circuit for synchronizing the decision and retiming circuit, said clock extraction circuit comprising a filter for selecting the clock frequency from received NRZ PCM data signal, and an amplifier for amplifying the selected signal, said amplifier including a plurality of similar cascaded amplifier sections with selective local feedback which minimizes any offset voltages in the respective amplifier sections.

In order that the invention can be clearly understood reference will now be made to the accompanying drawings in which:

FIG. 2 shows a voltage waveform of the digital signal at point A in FIG. 1;

FIG. 3 shows a feedback pair amplifier circuit used here to explain the development of the present invention;

FIG. 5 is an equation showing the derivation of a voltage E in the circuit of FIG. 6;

FIG. 6 is a circuit diagram of another transistor amplifier stage used to explain the function of the circuit of FIG. 4;

Figure 1:
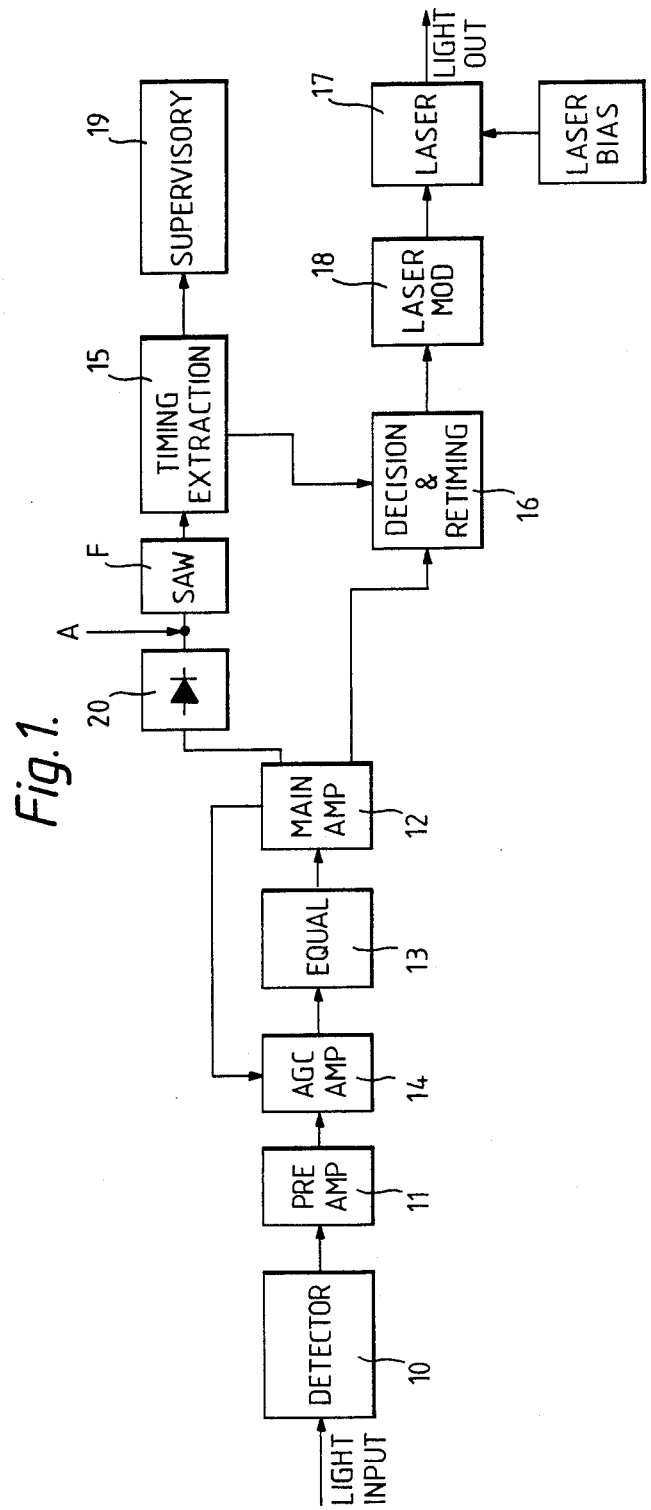
FIG. 1 shows in block schematic form an optical digital signal regenerator for an undersea telecommunications system as described in the aforementioned patent application.

Referring to FIG. 1, if we assume that the rectified, 10101010 data which appears at point A in FIG. 1 is fed into a SAW filter and is as shown in FIG. 2, then the clock content is about 424 mV peak to peak or −3.5 dbm 50Ω. The above assumes that the data is severely bandwidth limited so that 10101010 data appears substantially as a sine wave at half the clock frequency.

If the SAW filter has 29 db of loss, if a silicon diode limiter is involved as the rectifier in box 15, and if we want to accommodate a 11110000 pattern then 52 db of voltage gain is wanted at clock frequency. The clock signal in this timing extractor box 15 has been separated from its data and so phase stability with time and temperature is essential.

The so-called constant power circuit of the above-mentioned patent application relies upon the data pulses being reasonably square so that pulses generated from leading edges could trigger the discharge of a capacitor charged from a constant current source. However attempts to sharpen the leading edges of band limited pulses tended to introduce large amounts of jitter.

Several kinds of SAW transducer tuning have been tried. Tuning has been found to save over 20 db of gain but pass band distortion due to triple transit response is difficult to control. At 325 Mc/s it is very difficult to design an amplifier with a low input impedance or one with a high input impedance. The SAW transducers have a wide range resistance. This means that the effective Q of the transducer tuning is hard to control and so much of this passive circuit gain has to be surrendered. Pass band distortion is a problem due to the clock filters having to accommodate the FM sidebands of the supervisor tones, these being test tones sent out in the data to cause system supervisory measurements to be made.

One object of the present invention where the "saving of gain" is not possible, is to obtained high gain at clock frequency. The classical way would be to tune the amplifier using coils, but this makes the integration costly. This in turn means that the amplifier must use the minimum number of reactive components, L or C, as these have to be outside the integrated circuit. It is very desirable to use balanced circuits and so two coupling capacitors are required to DC block cascaded stages. The feedback pair amplifier shown in FIG. 3, unbalanced for simplicity, is usually used in HF applications as it is self biasing and it yields the greatest gain bandwidth product.

This amplifier tends to be not-optimum:

(a) Negative feedback destroys gain which could be usefully used to enhance limiting.

(b) Feedback tends to keep the response flat (it cannot be shaped without introducing coils or capacitors or both), but a flat response is not wanted; out of band gain introduces noise and jitter.

(c) Loop feedback makes an amplifier flat partly due to the feedback changing its phase with frequency. This makes the phase of the external gain depend on the amplitude of the loop gain. The latter changes with temperature and so loop feedback clock amplifiers tend to be more temperature sensitive than amplifiers not using loop feedback.

(d) Being self biasing, stringing loop feedback amplifiers together, without DC blocking capacitors, is difficult.

Figures 4, 4A:
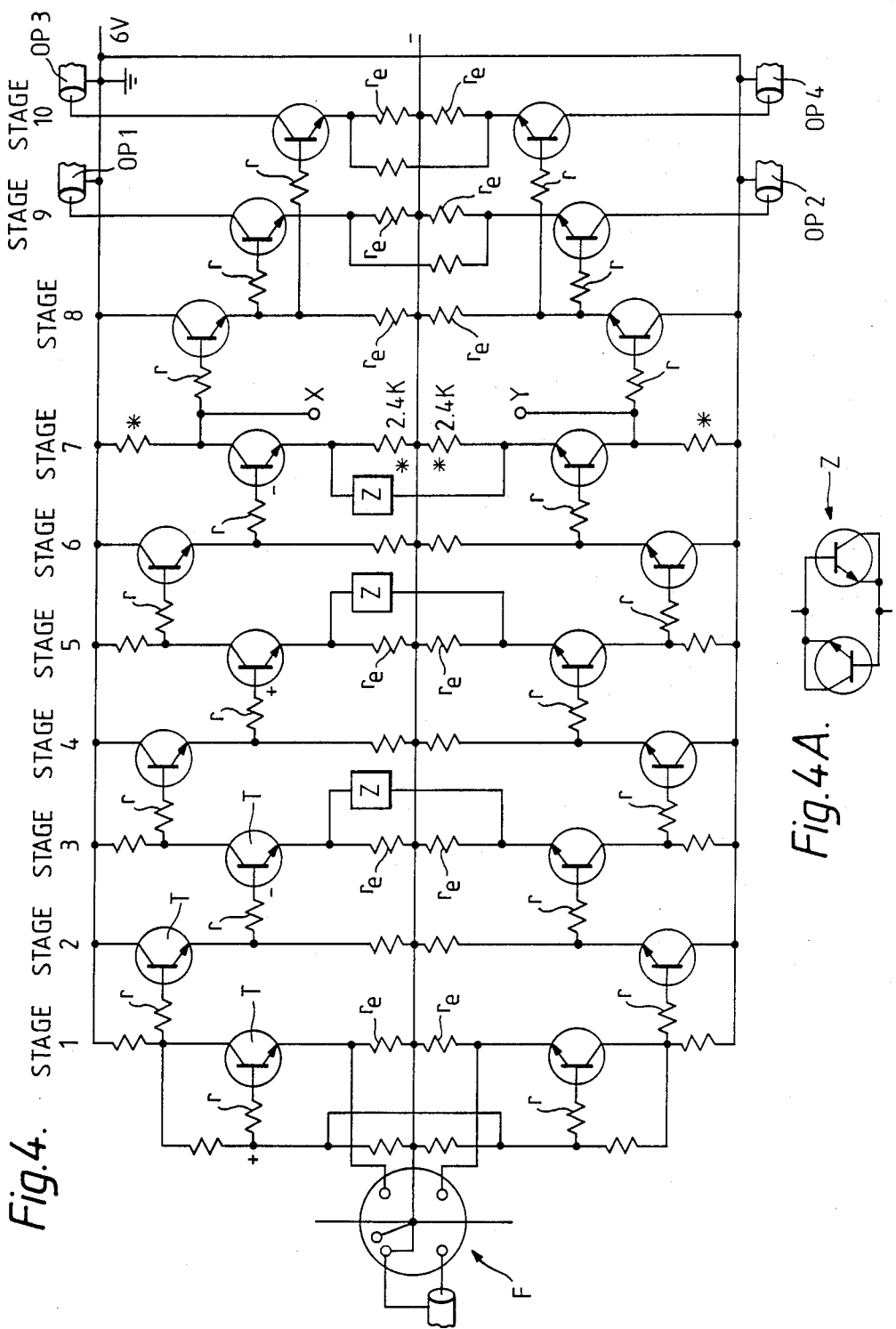
FIG. 4 is a circuit diagram of a clock extraction circuit according to an embodiment of the invention and suitable for use as the circuit 15 in FIG. 1.
FIG. 4A shows use of transistors for their self capacity.

The amplifier circuit shown in FIG. 4 avoids loop feedback, and is intended to have the minimum local feedback at clock frequency. Many stages can be cascaded. The resulting gain is shaped by three capacitors Z or the self capacity of transistors may be used as illustrated in FIG. 4A.

Figure 9:
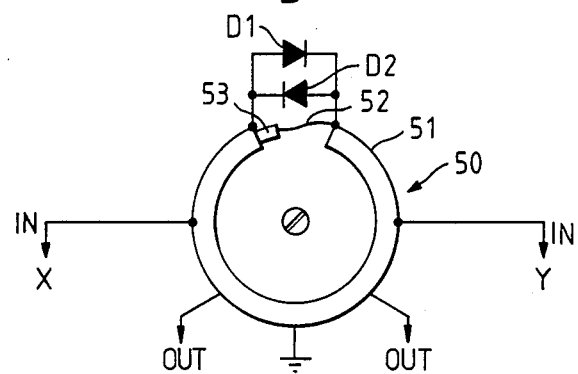
FIG. 9 shows a resonator circuit suitable for use in the circuit of FIG. 4.

The prototype model uses BFR90 type transistors. In the amplifier stages 100 ohm resistors are put in as base resistors, such as r, so as to simulate the high base resistance of the ULA (uncommitted logic array) transistors such as T. The emitter resistors $r_e$ are typically of the order of 200 ohms in section 1, 800 ohms in stage 2, 4, 6 and 8, 400 ohms in stage 3 and 5 and 2.4 Kohms in stage 7 when a coil tuned by limiting diodes as shown in FIG. 9 is employed.

An ULA large transistor achieved 2.5 pf. The lab model showed a very flat gain maximum at clock frequency, 25 db down at 50 Mc/s and about 20 db down at 600 Mc/s. The SAW pass band shape was substantially the same as that given by the 50 ohm measurement in The Network Analyser.

Referring to FIG. 1 of the drawings the input circuit to filter F comprises a rectifier circuit 20 (FIG. 1) i.e. a non-linear circuit which distorts the signal to generate the clock frequency from the data: this clock frequency is very weak and is accompanied by many unwanted signals. The surface acoustic wave filter F selects the clock frequency and also introduces loss so that the signal fed to stage 1 of the amplifier is weaker still. The first stage of the amplifier of FIG. 4 is a balanced grounded base stage and so the SAW filter outputs into a low but not well defined impedance. Stage 1 also operates as a balanced DC voltage regulator producing at its collector a DC voltage E which, referring to FIG. 6, is given by the formula in FIG. 5 of the drawings, where:

$$A = a(1+\beta)(1+(c/d)+c$$

$$B = b(1+\beta)(1+(a/d)$$

$\beta$ = current gain $i_o$ = the current used to bias the following stage = 40 $\mu$A in the lab model;

Using the following values for the parameters a = 200Ω, b = 620, c = 7500, $\beta\Omega$81,.

d = 5100

$i_o\Omega$40 $\mu$A, $\nu$ = (the base-emitter voltage of the transistor) 0.7775 volt (average of two balanced input stages), A becomes 48,018, B becomes 52,834 and E works out to 3.830 volts when the measured average of the balanced circuit collectors is 3.834 volts.

Stage 2 is an emitter follower buffer giving a slight voltage loss at clock frequency and generating at its emitter a DC voltage of (E−v) volts.

The two emitter followers making up the balanced pair do not have equal output shapes. One tends to be distorted to the left and one to the right. The required response is from phase to phase.

Stage 3 is a long tailed pair with a $\pi$ section including a gain-shaping capacitive impedance for its tail. The optimum value for Z is about 10 pf. Two transistors (FIG. 4A) of the integrated circuit are used to achieve Z. Some loss of transverse gain occurs due to capacity shortage. At DC, stage 3 has equal emitter and collector loads, which loads are represented by emitter resistors $r_e$ and collector resistors $r_c$, respectively, and so offset voltages are not amplified, E−2 v is generated at emitters and 6−E+2 v at collectors.

This process is repeated. Stages 2 and 3 form an amplifier section which is cascaded three times (Stages 4 and 5, 6 and 7, 8 and 9). At stage 5 the original DC generated voltage E is produced at the collectors, independent of v.

Stage 7 has unequal emitter and collector loads as it is intended that AC voltage limiting should occur. The collectors of this stage are nominally at $$V = (E/4) + (v2) \text{ DC volts.}$$

In the lab model using discrete components the two collector voltages were 5.457 and 5.438 instead of the calculated value 5.430 volts.

FIG. 4 basically illustrates an embodiment of the circuit when the resonator of FIG. 9 is to be inserted between X and Y. A reference potential (−ve) is applied to all stages via a common line 60.

Figure 7:
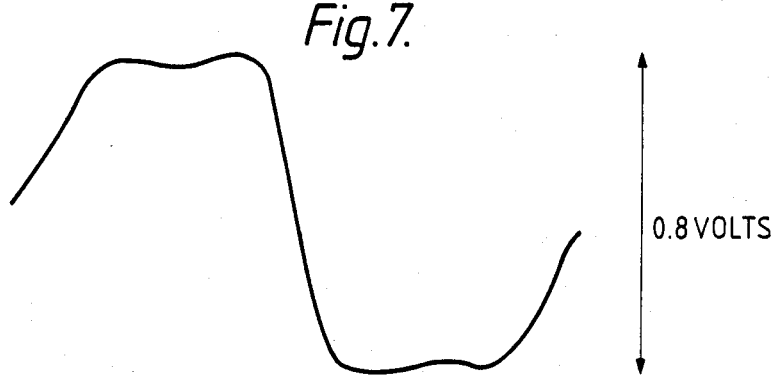
FIGS. 7 and 8 are voltage waveforms occurring in the circuit of FIG. 4.

The limiting action depends on the value of resistor R used:

R = 100Ω produces a flat topped wave (FIG. 7)

Figure 8:
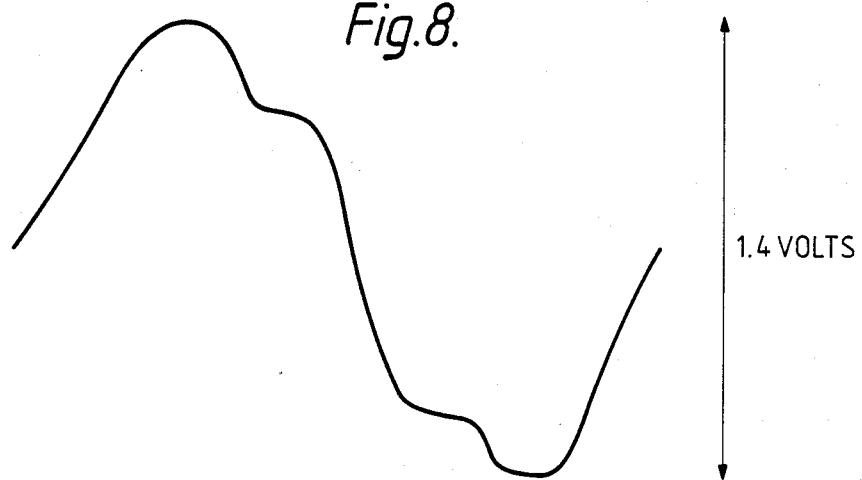

R = 0Ω produces a distorted sine wave (FIG. 8).

If also a choke is put between X and Y the output increases to 1.6 volts peak to peak and less distortion occurs.

The push pull outputs OP1 and OP2 from stage 9 feed the decision and retiming circuit 16 in FIG. 1 and the push pull outputs OP3 and OP4 from stage 10 feed the supervisory circuit 19.

The amplifier circuit as described above can use a limiter coil tuned by stray capacity, chiefly that of the two transistors used as limiting diodes. In such an amplifier the only component not inside the integrated circuit would be the adjustable coil. The model built gives out very clean sine waves. The coil is connected to the terminals X and Y and is as shown in FIG. 9 of the drawings. It comprises a semi-rigid copper coaxial cable 50 which resonates at 160 Mc/s (two turns) or 325 Mc/s (1 turn) depending on the system. The copper outer conductor 51 is connected by the link 52 to the inner conductor 53. Energy is introduced to the tuned circuit by connections X and Y connected to the outer conductor at the positions shown. Limiter diodes D1 and D2 are connected in anti-parallel across the resonator.

I claim:

1. A clock extraction circuit for extracting a clock frequency signal from an NRZ PCM signal, the circuit comprising: an input to which the NRZ PCM signal is applied; non-linear means for distorting the NRZ PCM signal to generate the clock frequency signal therefrom; a filter connected to the non-linear means for distorting the NRZ PCM signal for selecting the clock frequency signal; an amplifier for amplifying a selected clock frequency signal from the filter, the amplifier including an integrated circuit comprising a plurality of cascaded amplifier sections operatively interconnected such that offset voltages in the amplifier sections are minimized, capacitive means for minimizing said offset voltages, said capacitive means comprising transistors connected to certain of said amplifier sections as capacitive elements, and an output, for an amplified clock frequency signal from said amplifier which comprises said extracted clock frequency signal, coupled to the last of the cascaded amplifier sections.

2. A circuit as claimed in claim 1, wherein the amplifier includes a first stage prior to said cascaded amplifier sections, which first stage comprises an input balanced grounded-base stage providing low input impedance.

3. A circuit as claimed in claim 1, wherein an amplifier section includes a balanced emitter follower buffer stage.

4. A circuit as claimed in claim 3, wherein in the amplifier section the buffer stage is followed by a balanced long-tailed pair, said long-tailed pair having a pi-section for a tail thereof.

5. A circuit as claimed in claim 4, wherein the long-tailed pair has equal emitter and collector loads whereby D.C. offset voltages are not amplified.

6. A circuit as claimed in claim 4, wherein the pi-section includes a gain-shaping capacitive impedance.

7. A circuit as claimed in claim 1, wherein the filter is a surface acoustic wave filter.

8. A circuit as claimed in claim 1, comprising a resonant circuit connected across an output of one of the amplifier sections near said clock extraction circuit output.

9. A circuit as claimed in claim 8, wherein the resonant circuit comprises a semi-rigid cable providing a major portion of inductance and capacitance of said resonant circuit.

10. A circuit as claimed in claim 8 comprising two limiter diodes connected in (anti-) parallel across the resonant circuit and across said output of one of the amplifier sections, the diodes being arranged to conduct in opposite directions.

11. A digital regenerator for regenerating a received NRZ PCM data signal in an optical digital transmission system comprising: a light input detector; a main amplifier for amplifying an electrical signal derived from the detector; a decision and retiming circuit connected to receive an amplified signal from the main amplifier; a light output device for providing an output light signal representative of a signal from the decision and retiming circuit; and a clock frequency signal extraction circuit for synchronizing the decision and retiming circuit, said clock frequency signal extraction circuit comprising an input to which the NRZ PCM data signal is applied; non-linear means for distorting the received NRZ PCM data signal to generate a clock frequency signal therefrom; a filter connected to the non-linear means for distorting the received NRZ PCM data signal for selecting the clock frequency signal; an amplifier for amplifying a selected clock frequency signal from the filter, said amplifier including an integrated circuit comprising a plurality of cascaded amplifier sections operatively interconnected such that offset voltages in the amplifier sections are minimized, capacitive means for minimizing said offset voltages, said capacitive means comprising transistors connected to certain of said amplifier sections as capacitive elements; and an output, for an amplified clock frequency signal from the amplifier which comprises an extracted clock frequency signal from said clock frequency extraction circuit, coupled to the last of the cascaded amplifier sections.

12. A circuit as claimed in claim 5, wherein the pi-section includes a gain-shaping capacitive impedance.

13. A circuit as claimed in claim 9, comprising two limiter diodes connected in (anti-) parallel across the resonant circuit and across said output of one of the amplifier sections, the diodes being arranged to conduct in opposite directions.

14. A clock extraction circuit for extracting a clock frequency signal from an NRZ PCM signal, the circuit comprising: an input to which the NRZ PCM signal is applied; non-linear means for distorting the NRZ PCM signal to generate the clock frequency signal therefrom; a filter connected to the non-linear means for distorting the NRZ PCM signal for selecting the clock frequency signal; an amplifier for amplifying a selected clock frequency signal from the filter, the amplifier including an integrated circuit comprising a plurality of cascaded amplifier sections, certain amplifier sections having local feedback for minimizing offset voltages, each amplifier including a balanced emitter follower buffer stage connected to a balanced long-tailed pair, said long-tailed pair having a pi-section for a tail thereof; and an output, for an amplified clock frequency signal from said amplifier, coupled to the last of the cascaded amplifier sections.

15. A circuit as claimed in claim 14, the integrated circuit comprising capacitive means for minimizing said offset voltages, said capacitive means comprising transistors connected to certain of said amplifier sections as capacitive elements.

16. A circuit as claimed in claim 14, wherein the amplifier includes a first stage prior to said cascaded amplifier sections, which first stage comprises an input balanced grounded-base stage providing a low input impedance.

17. A circuit as claimed in claim 14, wherein the long-tailed pair has equal emitter and collector leads whereby D.C. offset voltages are not amplified.

18. A circuit as claimed in claim 14, wherein the pi-section includes a gain-shaping capacitive impedance.

19. A circuit as claimed in claim 14, wherein the filter is a surface acoustic wave filter.

20. A circuit as claimed in claim 14, comprising a resonant circuit connected across an output of one of the amplifier sections near said clock extraction circuit output.

21. A circuit as claimed in claim 20, wherein the resonant circuit comprises a semi-rigid cable providing a major portion of inductance and capacitance of said resonant circuit.

22. A circuit as claimed in claim 20 comprising two limiter diodes connected in (anti-) parallel across the resonant circuit and across said output of one of the amplifier sections, the diodes being arranged to conduct in opposite directions.

23. A digital regenerator for regenerating a received NRZ PCM data signal in an optical digital transmission system comprising: a light input detector; a main amplifier for amplifying an electrical signal derived from the detector; a decision and retiming circuit connected to receive an amplified signal from the main amplifier; a light output device for providing an output light signal representative of a signal from the decision and retiming circuit; and a clock frequency signal extraction circuit for synchronizing the decision and retiming circuit, said clock frequency signal extraction circuit comprising: an input to which the NRZ PCM data signal is applied, non-linear means for distorting the received NRZ PCM data signal to generate a clock frequency signal therefrom, a filter connected to the non-linear means for distorting the received NRZ PCM data signal for selecting the clock frequency signal; and an amplifier for amplifying a selected clock frequency signal from the filter, said amplifier including a plurality of cascaded amplifier sections, certain amplifier sections having local feedback for minimizing offset voltages, each amplifier section including a balanced emitter follower buffer stage connected to a balanced long-tailed pair, said long-tailed pair having a pi-section for a tail thereof; and an output, for an amplified clock frequency signal from said amplifier which comprises an extracted clock frequency signal from said clock frequency signal extraction circuit, coupled to the last of the cascaded amplifier sections.

24. A clock extraction circuit for extracting a clock frequency signal from an NRZ PCM signal, the circuit comprising: an input to which the NRZ PCM signal is applied; non-linear means for distorting the NRZ PCM signal to generate the clock frequency signal therefrom; a surface acoustic wave filter connected to the non-linear means for distorting the NRZ PCM signal for selecting the clock frequency signal; an amplifier for amplifying a selected clock frequency signal from the filter, the amplifier including an integrated circuit comprising a plurality of cascaded amplifier sections certain amplifier sections having local feedback for minimizing offset voltages; and an output, for an amplified clock frequency signal from said amplifier, coupled to the last of the cascaded amplifier sections.

* * * * *

UNITED STATES PATENT AND TRADEMARK OFFICE
CERTIFICATE OF CORRECTION

PATENT NO. : 4,736,120
DATED : April 5, 1988
INVENTOR(S) : Basil B. FOSTER

It is certified that error appears in the above-identified patent and that said Letters Patent is hereby corrected as shown below:

Title page:

[30]   FOREIGN APPLICATION PRIORITY DATA

Change "December 12, 1983" to --DECEMBER 16, 1988--;

Column 6, line 67:   Claim 17, line 2, change "leads" to --loads--.

Signed and Sealed this

Second Day of May, 1989

Attest:

DONALD J. QUIGG

Attesting Officer   Commissioner of Patents and Trademarks